No. 753,177.                                              Patented February 23, 1904.

UNITED STATES PATENT OFFICE.

JOKICHI TAKAMINE, OF NEW YORK, N. Y.

GLANDULAR EXTRACTIVE COMPOUND.

SPECIFICATION forming part of Letters Patent No. 753,177, dated February 23, 1904.

Application filed May 12, 1903. Serial No. 156,747. (No specimens.)

*To all whom it may concern:*

Be it known that I, JOKICHI TAKAMINE, a subject of the Emperor of Japan, residing in New York, in the county and State of New York, have invented a new and useful Glandular Extractive Compound, of which the following is a specification.

My invention relates to new and useful compounds possessing the physiological, therapeutic, and other characteristics and reactions of the blood-pressure-raising, hemostatic, and astringent principle of suprarenal glands.

In my Patent No. 730,176, dated June 2, 1903, originally applied for November 5, 1900, described a new product possessing the ..ood-pressure-raising, astringent, and hemostatic properties of the suprarenal glands in a pure, concentrated, and stable form, and in other patents—viz., Nos. 730,175, 730,196, and 730,197—I have described processes for preparing said product. Said new product is difficultly soluble in water, and although stable when pure and dry I have found that its solution in water is changed by exposure to air, so as to substantially interfere with its physiological utility within a short time. To avoid this danger, it is sold dry or in crystalline form. I have sought for means of rendering said product readily soluble in water, as well as rendering its solution in water substantially stable for commercial purposes. I have discovered that said product is a base. I have also discovered that salts of said base are readily soluble in water. I have also discovered that the said salt solutions possess substantially the blood-pressure-raising, hemostatic, and astringent properties of said basic product. I have also discovered that the solution of salts of said base in water is commercially stable. The instability of the solution of the said base in water seems to be because it possesses such an affinity for the oxygen of the air as to absorb sufficient oxygen to oxidize the base and destroy its useful properties within too short a time to enable such solution to be commercially or practically available. I have, however, discovered that this affinity for the oxygen of the air can be so far satisfied and neutralized that the water solution refrains from absorbing the oxygen of the air to such an extent as to be practically stable for ordinary commercial handling, use, and sale.

In carrying out my present invention I prefer to proceed as follows: A measured quantity of the product described in my said Patent No. 730,176 is taken. Its basicity is determined by any of the well-known methods by titrating with a standard solution of an acid. The amount of acid required to neutralize a given quantity of the product is ascertained, and from this is determined in a manner well known to chemists of ordinary skill the amount of the acid required to neutralize a given quantity of the said product and form the salt thereof. For example, for every hundred parts, by weight, of said product in crystals 26.71 parts of $H_2SO_4$ may be used. When the acid is brought in contact with the base for the formation of the salt, a sufficient amount of water should be present to prevent the decomposition or destruction of properties of the sensitive base by the acid. For this purpose a water-dilution of one hundred to one I have found to be sufficient. After the salt is prepared additional water is added until the dilution is from one thousand to one to ten thousand to one, which is the range of strength desirable for commercial purposes. I prefer to employ hydrochloric acid, the salt of which with said basic product is readily soluble in water. Said hydrochloric salt also has marked hygroscopic and deliquescent characteristics and is usually colorless. Its water solution is practically or commercially stable—that is to say, whatever tendency, if any, it may possess to change by exposure to the air is of so slight a degree as to be substantially immaterial with such exposure as is practically necessary for sale and use.

The solution made as above described forms a new commodity in pharmacy and materia medica whose composition and properties are substantially uniform, constant, and determinate, so that the practitioner may reliably anticipate the effect of a given quantity upon the patient. When intravenously injected, said solution causes a great rise in the blood-pressure. Applied externally it has remarkable hemostatic properties, causing a muscular contraction of the walls of the blood-vessels and enabling minor and delicate surgical operations to be performed in a bloodless field. It gives a beautiful green characteristic coloration in reaction with ferric salts and a red coloration with iodin-water. It is not precipitated by the ordinary alkaloid test reagents, mercury-potassium iodid, picric, tannic, phosphomolybdic or phosphotungstic acids, mercuric chlorid or lead nacetate. It possesses powerful reducing properties, reducing gold and silver salts with great energy. It possesses the therapeutic and physiological virtues of the said base substantially unimpaired by the presence of deleterious glandular or natural suprarenal matter.

I do not wish to limit myself to hydrochloric acid in carrying out my invention, since it is apparent that certain other substances may be employed in lieu thereof and will with sufficient dilution like it form a readily-soluble product from said base without detrimental decomposition—such as tartaric, citric, sulfurous, sulfuric, hydrobromic, chloric, formic, hydroiodic, hypophosphorous, dicloracetic, salicylic, phosphoric, nitric, acetic, benzoic, boric, gallic, mallic, succinic, phthallic, hydrophosphoric acids—and doubtless in the light disclosed by my present invention still other substances may be employed as equivalents.

It is to be understood that the term "stable" or "inert" as applied to my new solution is only absolute in a practical or commercial sense and is not meant to exclude the contingency that the solution may change if kept for an inordinate length of time or to exclude the employment of a preservative substance in the solution, if thought desirable.

I claim—

1. As an article of manufacture, a substance consisting of the blood-pressure-raising principle of the suprarenal glands chemically combined with a non-suprarenal substance whereby the stability of a water solution of said blood-pressure-raising principle is maintained.

2. As a new article of manufacture, a solution consisting of water and the blood-pressure-raising principle of the suprarenal glands chemically combined with a non-suprarenal substance whereby the stability of the solution is maintained.

3. As a new article of manufacture, a substance having the properties of the hemostatic, astringent and blood-pressure-raising principle of the suprarenal glands substantially free from non-blood-pressure-raising constituents thereof, which is soluble in water and the water solution of which is practically inert to the oxygen of the air and gives a green coloration with ferric chlorid and a red coloration with iodin.

4. As a new article of manufacture, a compound of the crystallizable blood-pressure-raising constituent of the suprarenal glands substantially free from the non-crystallizable constituents thereof which is soluble in water and which when in water solution is practically inert to the oxygen of the air and gives a green coloration with ferric chlorid and a red coloration with iodin.

5. The substance consisting of a salt of the herein-described product of the suprarenal glands; said salt being easily soluble in water and possessing the physiological and therapeutic characteristics and reactions of said product in substantially stable and concentrated form.

6. The substance consisting of a chemical compound of an inorganic acid and the herein-described product of the suprarenal glands; said compound having the physiological and therapeutic characteristics and reactions of said product in substantially stable and concentrated form.

7. The substance consisting of a chemical compound of a halogenic acid and the herein-described product of the suprarenal glands; said compound having the physiological and therapeutic characteristics and reactions of said product in substantially stable and concentrated form.

8. The substance consisting of a chlorid of the herein-described product of the suprarenal glands and having the physiological and therapeutical characteristics and reactions of said product in substantially stable and concentrated form.

JOKICHI TAKAMINE.

Witnesses:
HENRY C. WORKMAN,
J. GREEN.

DISCLAIMER.

753,177.—*Jokichi Takamine*, New York, N. Y. GLANDULAR EXTRACTIVE COMPOUND. Patent dated February 23, 1904. Disclaimer filed July 18, 1911, by the assignee, *Parke Davis & Co.*

Enters this disclaimer—

"To so much of said claims 3 and 4 as cover the benzoylated substance or compound."

[OFFICIAL GAZETTE, *July 25, 1911.*]